United States Patent
Singhai et al.

(10) Patent No.: US 7,535,929 B2
(45) Date of Patent: May 19, 2009

(54) SYSTEM AND METHOD FOR TOKEN-BASED PPP FRAGMENT SCHEDULING

(76) Inventors: Sandeep Singhai, 8520 Costa Verde Blvd., Apt. 3105, San Diego, CA (US) 92122; Ben A. Saidi, 11722 Springside Rd., San Diego, CA (US) 92128

( * ) Notice: Subject to any disclaimer, the term of this patent is extended or adjusted under 35 U.S.C. 154(b) by 790 days.

(21) Appl. No.: 10/255,518

(22) Filed: Sep. 25, 2002

(65) Prior Publication Data

US 2003/0026218 A1 Feb. 6, 2003

Related U.S. Application Data

(60) Provisional application No. 60/335,680, filed on Oct. 25, 2001.

(51) Int. Cl.
*H04J 3/24* (2006.01)

(52) U.S. Cl. .................. 370/473; 370/536

(58) Field of Classification Search ........... 370/468, 370/466, 473, 395.5–395.65, 394; 709/236, 709/238
See application file for complete search history.

(56) References Cited

U.S. PATENT DOCUMENTS

| | | | | |
|---|---|---|---|---|
| 5,960,002 | A * | 9/1999 | Ramfelt et al. | 370/450 |
| 6,212,190 | B1 | 4/2001 | Mulligan | 370/400 |
| 6,400,681 | B1 * | 6/2002 | Bertin et al. | 370/218 |
| 6,532,236 | B1 * | 3/2003 | De Vriendt | 370/395.1 |
| 6,658,016 | B1 * | 12/2003 | Dai et al. | 370/424 |
| 6,778,495 | B1 * | 8/2004 | Blair | 370/230 |
| 7,000,026 | B2 * | 2/2006 | Beshai et al. | 709/238 |
| 7,027,443 | B2 * | 4/2006 | Nichols et al. | 370/394 |
| 7,089,016 | B2 * | 8/2006 | Dokko | 455/452.1 |
| 2002/0186658 | A1 * | 12/2002 | Chiu et al. | 370/237 |
| 2003/0110286 | A1 * | 6/2003 | Antal et al. | 709/236 |

FOREIGN PATENT DOCUMENTS

| | | |
|---|---|---|
| JP | 63-73736 | 4/1988 |
| JP | 04-309039 | 10/1992 |
| JP | 06-112940 | 4/1994 |
| WO | 0133772 | 5/2001 |
| WO | 0141397 | 6/2001 |

OTHER PUBLICATIONS

Sklower K. et al., "RFC 1717 The Multilink Protocol (MP)", Nov. 1, 1994, IETF, Network Working Group XP002228512 section 2—section 4.

* cited by examiner

*Primary Examiner*—Thai Hoang D.

(57) ABSTRACT

To avoid lost packets that could otherwise occur were a round robin scheduling policy to be used to assign PPP packet fragments to multiple communication links, the links are assigned tokens based on their capacities, with a fragment being assigned to the link with the most tokens. When a fragment is scheduled to a link, the tokens of the link are decremented accordingly. The tokens are periodically refreshed.

32 Claims, 2 Drawing Sheets

LOGIC

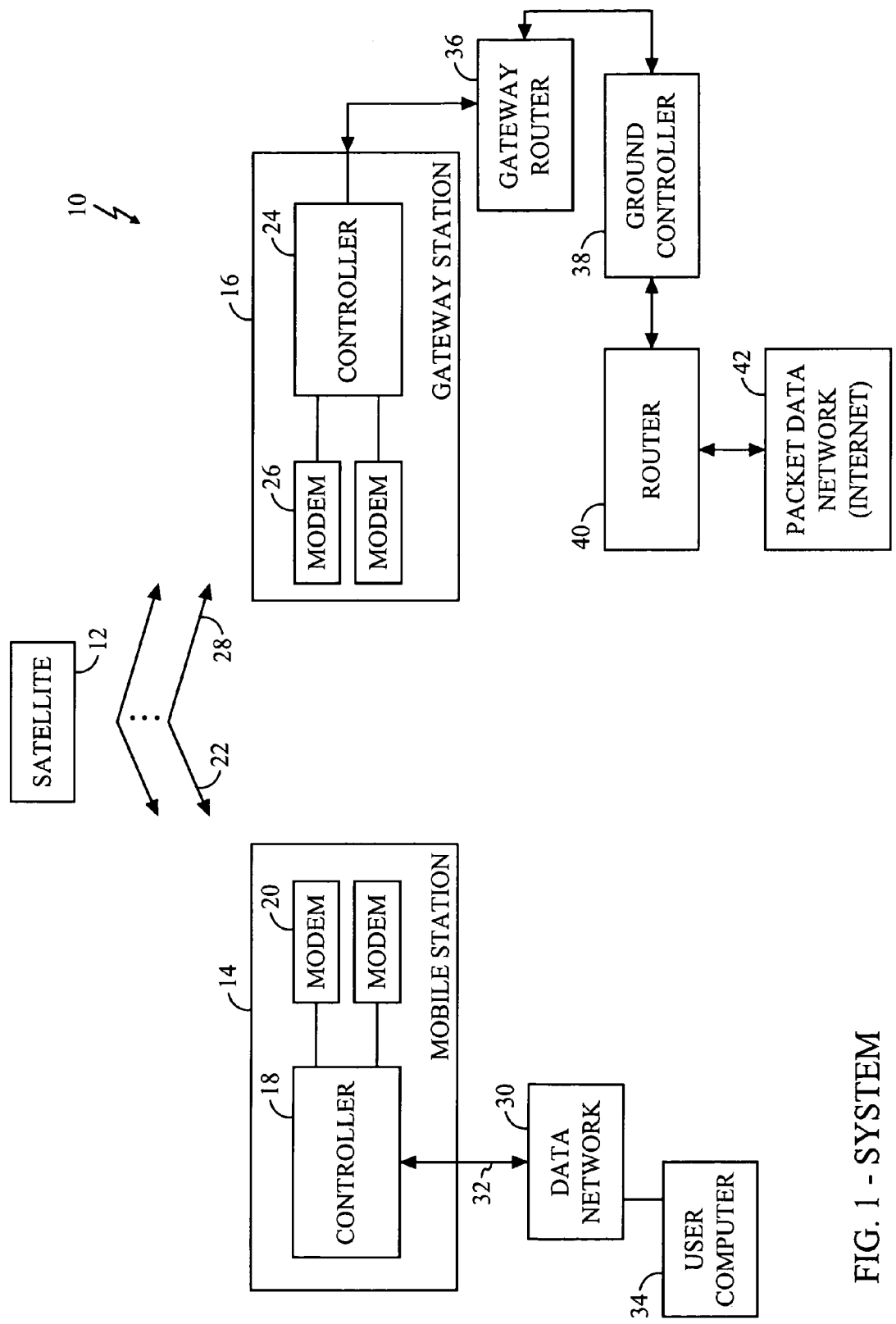
FIG. 1 - SYSTEM

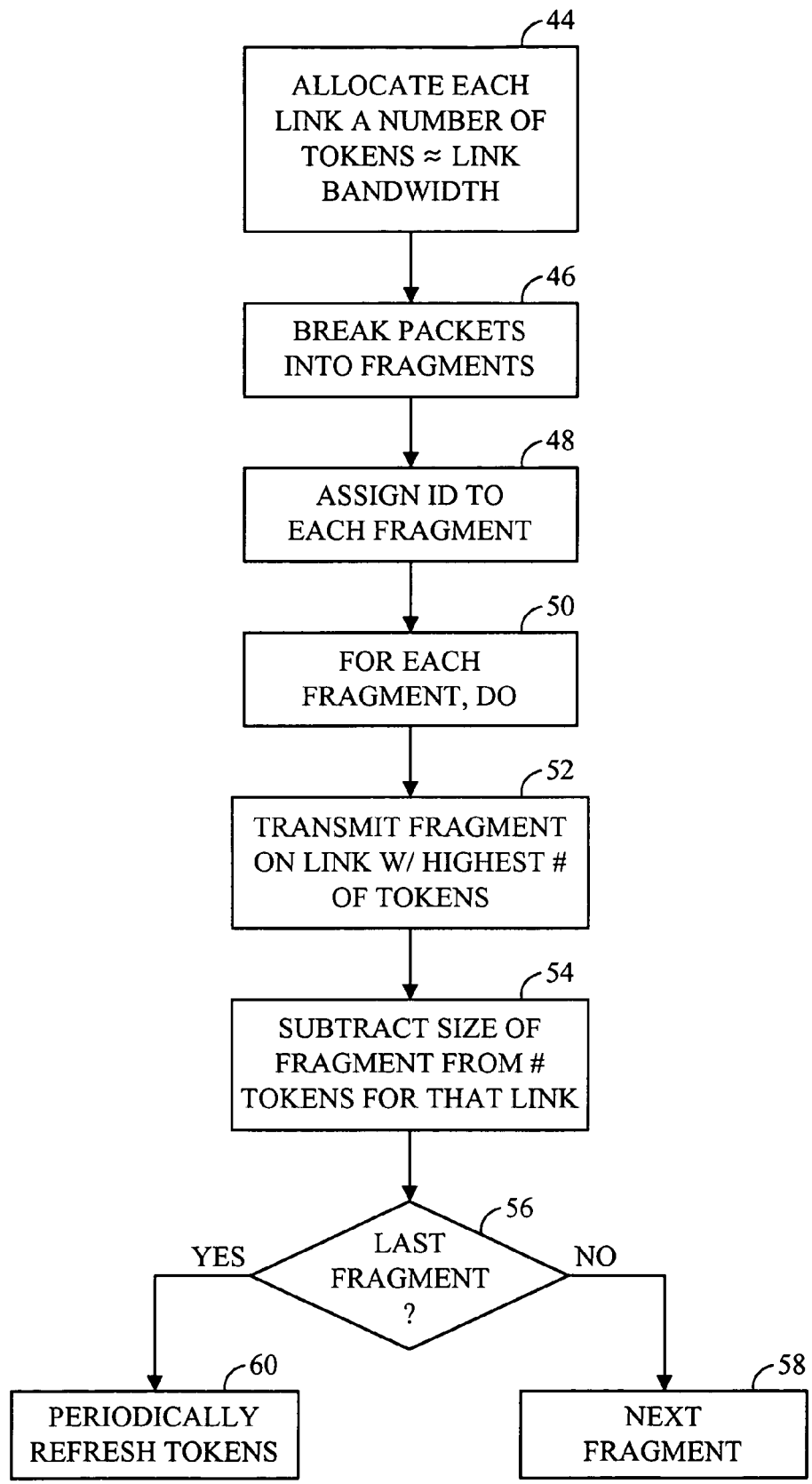
FIG. 2 - LOGIC

SYSTEM AND METHOD FOR TOKEN-BASED PPP FRAGMENT SCHEDULING

CROSS REFERENCED TO RELATED APPLICATIONS

This application claims priority from U.S. Provisional Patent Application entitled "Method And System For Aggregating Multiple Wireless Communication Channels For High Data Rate Transfers", Ser. No. 60/335,680, filed Oct. 25, 2001.

FIELD OF THE INVENTION

The present invention relates generally to multilink packetized data transmission.

BACKGROUND OF THE INVENTION

Data increasingly is communicated between computers, such as between a server and a user computer, using Internet Protocol (IP)-based principles. An example of a protocol that can be used to carry IP-based data is point-to-point protocol (PPP) framing of IP packets. That is, IP data packets can be communicated using PPP.

PPP can be used not only for communicating IP packets over wired portions of the Internet, but also to communicate data over wireless transmission paths to user computers that employ wireless communication principles such as but not limited to code division multiple access (CDMA) technology, GSM, wideband CDMA, and other wireless technologies. Such a communication scheme is disclosed in, e.g., co-pending U.S. provisional patent application Ser. No. 60/335,680, owned by the present assignee and incorporated herein by reference.

As disclosed in the above-referenced patent application, to increase bandwidth (i.e., to increase the amount of data per unit time that can be communicated between transmitter and receiver) and decrease latency, the IP packets being transmitted can be partitioned into fragments, with the fragments being sent in parallel over multiple links that are established between the transmitter and the receiver. The fragments are recombined at the receiver. The fragments are allocated to the links in round robin fashion, i.e., the first fragment is sent on the first link, the second fragment is sent on the second link, and so on.

The present invention critically observes that the round robin allocation of fragments can give rise to lost fragments. To explain, consider that the number of links typically is equal to the number of fragments per packet, and further consider that the last fragment of each packet is generally smaller than the others, representing, as it does, a remainder. In the presence of round robin fragment allocation (also referred to as round robin scheduling), this means that the last, smallest fragment of every packet is always scheduled on the same link, essentially rendering these links under-utilized, with the under-utilization being cumulative, i.e., it becomes progressively worse.

The smaller fragment, although having a higher sequence number than the fragments ahead of it in the packet, can arrive at the receiver first, where it is held pending arrival of the remaining fragments of the packet. Were the effects of link under-utilization not cumulative, this would not be a problem because systems typically will hold early-arriving fragments for a limited period. As observed above, however, when using round robin scheduling with the number of links being a multiple of the number of fragments per packet and with the last fragment of a packet being smaller than the other fragments, the effects of under-utilization are cumulative. As a consequence, the difference in arrival times of the smallest fragments vis-a-vis the other fragments of their packets can exceed the data hold time employed by the system, after the elapse of which the held fragment is flushed and, hence, lost. Such lost fragments result in the periodic loss of packets, with the system incorrectly regarding the loss of packets as being due to congestion.

Having made these critical observations, the solution below is provided.

SUMMARY OF THE INVENTION

A method for communicating data that is arranged in packets includes providing plural links between a transmitter and a receiver, and allocating capacity indicators, such as tokens, to each link. Each packet is partitioned into plural fragments. The capacity indicators (e.g., tokens) are used to associate the fragments with the links. Specifically, each fragment is associated with the link having a highest remaining capacity as indicated by the tokens at the time the fragment is scheduled. In this way, load balancing among the links is achieved, reducing the likelihood of too-early fragment arrival at the receiver and concomitant fragment loss.

In preferred non-limiting embodiments, the token or tokens associated with a link are decremented by an amount representative of the size of a fragment when the fragment has been assigned to the link. Essentially, the tokens of a link represent its current capacity as perceived by the system.

In another aspect, a transmitter that transmits packetized data in an IP protocol includes a controller. The controller receives packets of data and partitions the packets into fragments for transmission over multiple wireless links. Each fragment is scheduled for transmission on one of the wireless links based on a non-round robin allocation policy. The present policy can be referred to as a load balancing policy.

In still another aspect, a system for packetized data transmission includes means for partitioning data packets into fragments, and means for scheduling the fragments among plural communication links based on current perceived capacities of the links. Means are provided for transmitting fragments of a packet in parallel with each other over the links.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of one exemplary non-limiting communication system that can use the present PPP multilink principles; and FIG. 2 is a flow chart of the present logic.

DETAILED DESCRIPTION OF THE PREFERRED EMBODIMENT

Referring initially to FIG. 1, a communication system is shown, generally designated 10, that can include one or more satellites 12 for facilitating data communication between one or more mobile stations 14 (that may be carried on a moving platform) and one or more land-based gateway stations 16. The system 10 can be implemented in accordance with the well known Globalstar system. While FIG. 1 shows that satellite communication can be used, it is to be understood that the multilink packetized data communication principles disclosed herein apply generally to any multilink packetized data communication system, e.g., multiple ISDN bearer channels. In an exemplary embodiment, the packetized data principles used follow Internet Protocol (IP) principles and more particularly, though not exclusively, use point-to-point protocol (PPP) principles.

Continuing now with a description of the exemplary non-limiting system 10 shown in FIG. 1, a soft transfer (handoff) process between satellites 12, and also between individual ones of plural (e.g., sixteen) beams transmitted by each satellite, provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols, or even some types of Time Division Multiple Access (TDMA) systems can be employed. In addition to CDMA cellular systems described in the Telecommunications Industry Association/Electronic Industries Association (TIA/EIA) Standard IS-95, other wireless systems that can be used include combined AMPS & CDMA systems described in the TIA/EIA Standard IS-98. Still other communications systems are described in the International Mobile Telecommunications System 2000/Universal Mobile Telecommunications System or IMT-2000/UM standards, covering what are commonly referred to as wideband CDMA (WCDMA), cdma2000 (such as cdma2000 1×-rxtt cdma2000 1×, 3×, or MC standards, for example) or TDSCDMA. GSM principles may also be used. Satellite-based communication systems also utilize these or similar known standards.

As shown in FIG. 1, each mobile station 14 can include one or more controllers 18 that control plural modems 20 for communicating along respective links 22 with the satellite 12. Likewise, the gateway station 16 includes one or more controllers 24 that control plural modems 26 for communicating along respective links 28 with the satellite 12.

It is to be understood that the mobile stations 14 may be capable of operating in a full duplex mode and communicate via, by example, L-band RF links (uplink or return link) and S-band RF links (downlink or forward link) through return and forward satellite transponders. The return L band RF links may operate within a frequency range of 1.61 GHz to 1.625 GHz, a bandwidth of 16.5 MHz, and can be modulated with packetized digital voice signals and/or data signals in accordance with the preferred spread spectrum technique. The forward S band RF links may operate within a frequency range of 2.485 GHz to 2.5 GHz, and a bandwidth of 16.5 MHz. The forward RF links can also be modulated with packetized digital voice signals and/or data signals in accordance with the spread spectrum technique. The 16.5 MHz bandwidth of the forward link can be partitioned into, e.g., sixteen beams with thirteen sub-beams effectively forming two hundred eight FDM channels, each further accommodating around one hundred twenty eight code channels, with one user being assigned per forward link code channel, plus pilot signals, and so forth. The return link may have various bandwidths, and a given mobile station may or may not be assigned a different channel than the channel assigned on the forward link.

Moreover, the gateway stations 16 may communicate with the satellite 12 via, by example, a full duplex C band RF link (forward link (to the satellite), return link (from the satellite)) that operates within a range of frequencies generally above three GHz and preferably in the C-band. The C-band RF links bi-directionally convey the communication feeder links, and also convey satellite commands to the satellites and telemetry information from the satellites. The forward feeder link may operate in the band of 5 GHz to 5.25 GHz, while the return feeder link may operate in the band of 6.875 GHz to 7.075 GHz. As an example, several thousand full duplex communications may occur through a given one of the satellites 12. In accordance with a feature of the system 10, two or more satellites 12 may each convey the same communication between a given mobile station 12 and the gateway station 16. It is to be understood, however, that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

As shown in FIG. 1, the non-limiting mobile station 14 can be connected to a data network 30 over a communication link 32 such as an Ethernet link, Bluetooth based wireless link, or using a wireless transfer system based on 802.11 (IEEE) standards protocols. One or more user computers 34 can be coupled to data network 30. The present system also contemplates the use of handheld or laptop computers having wireless or wire line modems, PDAs, facsimile and other data transfer devices, including, but not limited to, gaming devices, paging devices, and so forth, that desire to transfer data to a user. In any case, the data network 30 can be a Local Area Network (LAN), or any other known network, and it can include data routers and can be connected to other networks.

As also shown in FIG. 1, the gateway station 16 communicates with a gateway router 36 in accordance with principles known in the art, which in turn communicates with a ground controller 38 such as a satellite operations control center and/or ground operations control center. The ground controller 38 communicates with a network router 40, which in turn communicates with a packet data network exemplified by the Internet. Accordingly, the gateway station 16 communicates with the Internet, and the mobile station 14 communicates with the gateway station 16 and, hence, the Internet via the satellite 12 for exchanging packetized data in accordance with the logic below.

Now referring to FIG. 2, the present logic can be seen. This logic may be executed by the mobile station 14 when transmitting packet data, or by the gateway station 16 when transmitting packet data, or by the satellite 12 when transmitting packet data.

Commencing at block 44, multiple links are established between the transmitter and receiver as set forth in, e.g., the above-referenced patent application, and then each link between the transmitter and receiver is assigned a capacity indicator indicating the amount of capacity available in the link at the time of indicator assignment. The present invention contemplates assigning "tokens" as capacity indicators but in general any indicator that is proportional to or otherwise indicates how much capacity the particular link has may be used.

Moving to block 46, packets of data received by the transmitter for transmission are broken into fragments. In one preferred non-limiting embodiment all fragments are of a predetermined size except the last fragment, which can be a fraction of the predetermined size, although the fragments may all have different sizes if desired. As contemplated in one preferred embodiment, the number of fragments per packet is equal to the number of available links. Typically, the packets, particularly IP packets, include destination information in their headers.

At block 48, a header containing an identification (ID) is assigned to each fragment indicating, among other things, the packet to which it belongs and its place in the packet. Then, at block 50 a DO loop is entered for each fragment. Proceeding to block 52, the fragment is transmitted on the link having the highest number of tokens, i.e., the fragment is assigned to and transmitted on the link that has the highest capacity. If two or more links each have the same capacity and that capacity is the highest among all the links as indicated by the tokens, the fragment can be assigned to the first one of such links or it can be assigned at random to one of the highest capacity links. Since the assigned fragment now consumes some of the link's capacity, to reflect this change in capacity at block 54 the size of the fragment is subtracted from the tokens allocated to that link. That is, at block 54 the capacity indicator of the link is decreased according to the size of the assigned fragment.

Moving from block 54 to decision diamond 56, it is determined whether the last fragment has been assigned and if not the next fragment is retrieved at block 58 and the above process repeated for that fragment. Otherwise the DO loop ends with the fragments of a packet having been transmitted over their respective links. Block 60 indicates that periodically the number of tokens assigned to the links are refreshed. For instance, once the link resumes an idle state, its capacity indicators (e.g., tokens) are replenished, indicating its current capacity.

At the receiver, it is possible that fragments are received out of order. If so, the receiver uses the fragment ID information to reconstruct the packets. The receiver also sequences the reconstructed packets in the predetermined sequence order based on the identifying information. The reconstructed packets are forwarded as appropriate in the correct sequence order.

In an exemplary arrangement of the present invention, each of the links has a data transmission bandwidth of approximately 9.6 Kilobits-persecond (Kbps). In the exemplary arrangement, up to twenty-four satellite modems or transceiver modules 20, and thus twenty-four links, operate concurrently, thereby achieving an aggregated transmission bandwidth of approximately 230 Kbps (24×9.6 Kbps=230.4 Kbps). More or less links may be aggregated to achieve correspondingly different data transmission bandwidths.

The fragments are processed in accordance with a link layer protocol, such as PPP, for example, in which case the transmitter appends a link layer protocol header (for example, a PPP header) to each of the packet fragments. If desired, the various headers that are appended to the fragments may be compressed to reduce the size of the packet fragments, and thus conserve data transmission bandwidth.

For the exemplary CDMA based satellite system 10 shown in FIG. 1 the forward link uses code channels on the FDM channels or sub-beams to distinguish users while on the reverse link user specific codes and an M-ARY modulation scheme are used on the sub-beams to distinguish users. It is to be understood, however, that the invention should not necessarily be so limited. For example, the present invention may be used with multiple, terrestrial-based, wireless or wireline communication channels, such as CDMA cellular or Personal Communications Services (PCS) communication channels, to achieve high data rate transfers. In an exemplary terrestrial-based application of the present invention, a mobile station 14 may reside in a land-base vehicle, such as an automobile, and include a plurality of concurrently operating CDMA cellular/PCS modems or transceiver modules or elements instead of satellite modems. The mobile station 14 may exchange data with a cellular/PCS base station, including a plurality of concurrently operating CDMA cellular/PCS modems (instead of a satellite gateway), over a plurality of concurrently operating CDMA cellular/PCS communication channels.

While the particular SYSTEM AND METHOD FOR TOKEN-BASED PPP FRAGMENT SCHEDULING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is-recited as a "step" instead of an "act".

What is claimed is:

1. A method for communicating data arranged in packets, comprising:
   providing plural links between a transmitter and a receiver;
   allocating at least one capacity indicator to each link;
   partitioning each packet into plural fragments, wherein a number of the plural fragments is equal to a number of available links among the plural links;
   using the capacity indicators, associating each of the plurality of fragments with a link having a highest available capacity as indicated by tokens; and
   transmitting the plural of fragments of a packet in parallel over the available links among the plural links.

2. The method at claim 1, comprising subtracting an amount representative of a size of a fragment from a number of tokens allocated to the link when the fragment has been assigned to the link.

3. The method of claim 1, further comprising assigning at least one identification to each fragment to enable reconstruction of the packet.

4. The method of claim 1, comprising reconstituting the fragments at the receiver, based on at least one identification assigned to each fragment, to reconstruct the packet.

5. The method of claim 1, comprising transmitting the fragments of a packet in parallel over the links.

6. The method of claim 1, wherein the packets are encapsulated in PPP.

7. The method of claim 1, farther comprising assigning the tokens to the links, the tokens being representative of the capacities of the respective links.

8. The method of claim 1, wherein the plural links comprise wireless communication links.

9. A transmitter transmitting packetized data in an IP protocol, comprising:
- a controller receiving packets of data and partitioning the packets into fragments, wherein a number of the fragments of a packet is equal to a number of available links among plural links, each fragment being scheduled for transmission on one of the available links based on an allocation policy in accordance with available link capacity, wherein the fragments of the packet are transmitted in parallel over the available links among the plural links;
- wherein the controller, for each fragment, associates the fragment to a link having a highest available capacity as indicated by tokens.

10. The transmitter of claim 9, wherein the controller is implemented in a mobile station.

11. The transmitter of claim 9, wherein the controller is implemented in a gateway station.

12. The transmitter of claim 9, wherein the controller is implemented in a satellite.

13. The transmitter of claim 9, wherein the controller assigns the tokens to links, the tokens being representative of the capacities of the respective links.

14. The transmitter of claim 13, wherein the controller subtracts an amount representative of a size of a fragment from a number of tokens allocated to the link when the fragment has been assigned to the link.

15. The transmitter of claim 9, wherein the controller transmits the fragments of a packet in parallel over the links.

16. The transmitter of claim 9, wherein the plural links comprise wireless communication links.

17. The transmitter of claim 9, wherein the controller is further operable to assign at least one identification to each fragment to enable reconstruction of the packet.

18. A system for packetized data transmission, comprising:
- means for partitioning data packets into fragments, wherein a number of the fragments of a packet is equal to a number of available links among plural links;
- means for scheduling the fragments among the available links based on current capacities of the available links, wherein the fragments of the packet are transmitted in parallel over the available links; and
- wherein the means for scheduling, for each fragment, associates the fragment to a link having a highest available capacity as indicated by tokens.

19. The system of claim 18, wherein at least the means for scheduling is implemented by at least one controller, wherein the controller assigns tokens to links, the tokens being representative of the capacities of the respective links.

20. The system of claim 19, wherein the controller subtracts an amount representative of a size of a fragment from a number of tokens allocated to the link when the fragment has been assigned to the link.

21. The system of claim 18, wherein the controller is implemented in a mobile station.

22. The system of claim 18, wherein the controller is implemented in a gateway station.

23. The system of claim 18, wherein the controller is implemented in a satellite.

24. The system of claim 18, further comprising means for transmitting the fragments of a packet in parallel with each other over the links.

25. The system of claim 18, wherein the plural links comprise wireless communication links.

26. The system of claim 18, further comprising means for assigning at least one identification to each fragment to enable reconstruction of the packet.

27. A mobile station, comprising:
- a controller for controlling at least one modem for communicating via plural links, wherein the controller receives packets of data and partition the packets into fragments, wherein a number of the fragments of a packet is equal to a number of available links among the plural links, each fragment being scheduled for transmission on one of the available links based on an allocation policy in accordance with available link capacity, wherein the fragments of the packet are transmitted in parallel over the available links among the plural links; and
- wherein the controller, for each fragment, associates the fragment to a link having a highest available capacity as indicated by tokens.

28. The mobile station of claim 27, wherein the controller is further operable to assign the tokens to links, the tokens being representative of the capacities of the respective links.

29. The mobile station of claim 28, wherein the controller is further operable to subtract an amount representative of a size of a fragment from a number of tokens allocated to the link when the fragment has been assigned to the link.

30. The mobile station of claim 27, wherein the controller is further operable to transmit the fragments of a packet in parallel over the links.

31. The mobile station of claim 27, wherein the plural links comprise wireless communication links.

32. The mobile station of claim 27, wherein the controller is further operable to assign at least one identification to each fragment to enable reconstruction of the packet.

* * * * *